(12) United States Patent
Pyo

(10) Patent No.: US 9,031,744 B2
(45) Date of Patent: May 12, 2015

(54) ELECTRIC POWER STEERING APPARATUS AND METHOD OF CONTROLLING THE SAME

(71) Applicant: Mando Corporation, Pyeongtaek-Si (KR)

(72) Inventor: Jong Hyun Pyo, Gyeonggi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/762,212

(22) Filed: Feb. 7, 2013

(65) Prior Publication Data

US 2014/0188337 A1    Jul. 3, 2014

(30) Foreign Application Priority Data

Feb. 7, 2012  (KR) .................. 10-2012-0012155

(51) Int. Cl.
  *B62D 6/10*    (2006.01)
  *B62D 5/04*    (2006.01)

(52) U.S. Cl.
  CPC ............. *B62D 6/10* (2013.01); *B62D 5/0463* (2013.01); *B62D 5/0469* (2013.01)

(58) Field of Classification Search
  CPC ......... B62D 6/002; B62D 6/003; B62D 6/008
  See application file for complete search history.

(56) References Cited

U.S. PATENT DOCUMENTS

| | | | |
|---|---|---|---|
| 6,922,621 B2* | 7/2005 | Kodama et al. | 701/41 |
| 7,106,012 B2* | 9/2006 | Matsuda et al. | 318/139 |
| 7,583,069 B2* | 9/2009 | Suzuki | 323/285 |
| 7,596,441 B2* | 9/2009 | Yokota et al. | 701/41 |
| 2003/0045981 A1* | 3/2003 | Kifuku et al. | 701/41 |
| 2003/0111291 A1* | 6/2003 | Jonokuchi et al. | 180/446 |
| 2005/0121252 A1* | 6/2005 | Tsuchiya | 180/446 |
| 2006/0231325 A1* | 10/2006 | Tamaizumi | 180/446 |
| 2008/0039996 A1* | 2/2008 | Lee | 701/34 |
| 2008/0066995 A1* | 3/2008 | Yabuguchi et al. | 180/446 |
| 2009/0078493 A1* | 3/2009 | Nagase | 180/443 |
| 2009/0105907 A1* | 4/2009 | Yamaguchi et al. | 701/41 |
| 2009/0114470 A1* | 5/2009 | Shimizu et al. | 180/444 |
| 2009/0240389 A1* | 9/2009 | Nomura et al. | 701/29 |
| 2011/0272205 A1* | 11/2011 | Fujimoto et al. | 180/446 |

FOREIGN PATENT DOCUMENTS

| | | |
|---|---|---|
| JP | 2004-175196 A | 6/2004 |
| JP | 2008-284889 A | 11/2008 |

* cited by examiner

*Primary Examiner* — John R Olszewski
*Assistant Examiner* — Nicholas K Wiltey
(74) *Attorney, Agent, or Firm* — McDermott Will & Emery LLP

(57) ABSTRACT

Disclosed are an electric power steering apparatus which controls a current supplied to a motor to adjust a torque of a steering wheel, thereby solving a catching feeling generated when the steering wheel is rotated from opposite ends to a center, and a method of controlling the same.

5 Claims, 6 Drawing Sheets

| | STEERING WHEEL | | |
|---|---|---|---|
| | LEFT END | CENTER | RIGHT END |
| STEERING ANGLE | (− STEERING ANGLE) − ◀— 0 —▶ + (+ STEERING ANGLE)<br>(− STEERING ANGLE) − —▶ 0 ◀— + (+ STEERING ANGLE) | | |
| TORQUE | (− TORQUE) − ◀— 0 —▶ + (+ TORQUE)<br>(+ TORQUE) + —▶ 0 ◀— − (− TORQUE) | | |

*FIG.2*

| | STEERING WHEEL | | |
|---|---|---|---|
| | LEFT END | CENTER | RIGHT END |
| STEERING ANGLE | (− STEERING ANGLE) −<br>(− STEERING ANGLE) − | ← 0<br>→ 0 | + (+ STEERING ANGLE)<br>+ (+ STEERING ANGLE) |
| TORQUE | (− TORQUE) −<br>(+ TORQUE) + | ↓ 0<br>↑ 0 | + (+ TORQUE)<br>− (− TORQUE) |

ELECTRIC POWER STEERING APPARATUS AND METHOD OF CONTROLLING THE SAME

CROSS-REFERENCE TO RELATED APPLICATION

This application claims priority from and the benefit under 35 U.S.C. 119(a) of Korean Patent Application No. 10-2012-0012155, filed on Feb. 7, 2012, which is hereby incorporated by reference for all purposes as if fully set forth herein.

BACKGROUND OF THE INVENTION

1. Field of the invention

The present invention relates to an electric power steering apparatus and a method of manufacturing the same, and more particularly, to an electric power steering apparatus which controls a current supplied to a motor to adjust a torque of a steering wheel, thereby solving a catching feeling generated when the steering wheel is rotated from opposite ends to a center, and a method of controlling the same.

2. Description of the Prior Art

In general, a power steering apparatus for a vehicle is used to mitigate a steering force of a steering wheel (handle) to secure a stability of steering. A hydraulic power steering (HPS) system using hydraulic pressure has been widely used as the power steering apparatus according to the related art, but in recent years, an environment-friendly electric power steering (EPS) system which assists a steering force of a driver by using a rotating force of a motor unlike an existing method of using hydraulic pressure is being generally installed in a vehicle.

In the electronic power steering (EPS) system, an electronic control unit (ECU) drives a motor according to a travel condition of a vehicle detected by a speed sensor, a steering sensor, a torque sensor, and the like to give a light and comfortable steering feeling during a low speed travel and give both a heavy steering feeling and an excellent directional stability during a high speed travel, and promptly provides a restoring force to the steering wheel according to a rotation angle of the steering wheel to enable a rapid steering operation in an emergency situation, providing a driver with an optimum steering condition.

Meanwhile, in the electric steering apparatus, a motor is installed outside a steering column disposed between the steering wheel and a gear box to rotate a steering shaft such that a rotating force of the steering wheel of a driver may be transferred to a lower side, to assist a steering force of the driver according to a steering operation of the steering wheel.

Meanwhile, the electric power steering apparatus includes a rack end stop function to prevent the steering wheel from experiencing mechanical contacts at opposite ends thereof to generate noise when a driver rotates the steering wheel to a right or left end.

The rack end stop function reduces a current supplied to a motor before the steering wheel mechanically contacts an end to reduce an auxiliary torque when the driver rotates the steering wheel toward the right or left end, thereby preventing the steering wheel from mechanically contacting the end.

By using the rack end stop function, an output required by the motor increases but an auxiliary torque is reduced when the driver rotates the steering wheel from the right or left end toward the center, thereby allowing the driver to feel a catching feeling. Accordingly, there is a need to eliminate a catching feeling that may be felt by the driver.

SUMMARY OF THE INVENTION

Accordingly, the present invention has been made to solve the above-mentioned problems occurring in the prior art, and an object of the present invention is to provide an electric power steering apparatus which controls a current supplied to a motor to adjust a torque of a steering wheel, thereby solving a catching feeling generated when the steering wheel is rotated from opposite ends to a center, and a method of controlling the same.

In accordance with one aspect of the present invention, there is provided an electric power steering apparatus including: a torque sensor for detecting a torque applied to a steering wheel by a driver and outputting an electrical signal proportional to the detected torque; a steering sensor for outputting an electrical signal proportional to a rotation angle of the steering wheel; a motor for generating an auxiliary power applied to the steering wheel; and an electronic control unit for adjusting an amount of current applied to the motor according to whether a code of the electrical signal output from the torque sensor and a code of the electrical signal output from the steering sensor are the same.

In accordance with another aspect of the present invention, there is provided a method of controlling an electric power steering apparatus, the method including: detecting a torque applied to a steering wheel by a driver, and outputting an electrical signal proportional to the detected torque; outputting an electrical signal proportional to a rotation angle of the steering wheel; determining whether a code of the electrical signal output from the torque sensor and a code of the electrical signal provided from the steering sensor are the same; and adjusting an amount of current applied to a motor for generating auxiliary power applied to the steering wheel according to whether the codes of the electrical signals are the same.

According to the present invention, by ramping up an amount of current of a motor restricted by a rack end stop function to increase a torque of the steering wheel or restricting the rack end stop function when the steering wheel is rotated from a right or left end to a center, a catching feeling can be prevented when a driver rotates the steering wheel from the right or left end to the center.

BRIEF DESCRIPTION OF THE DRAWINGS

The above and other objects, features and advantages of the present invention will be more apparent from the following detailed description taken in conjunction with the accompanying drawings, in which:

FIG. 2 is a table representing electrical signals generated in a steering sensor and a torque sensor according to a rotation direction of a steering wheel in the electric power steering apparatus of the present invention;

DETAILED DESCRIPTION OF THE PREFERRED EMBODIMENTS

Figure 1:
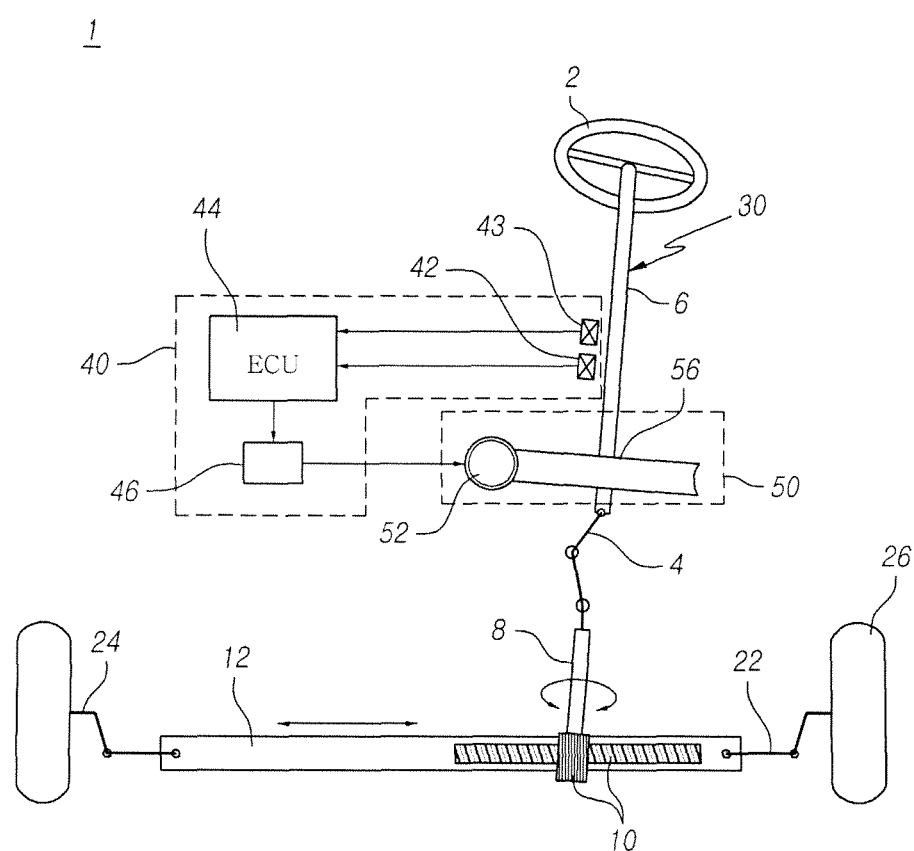
FIG. 1 is a schematic diagram of an electric power steering apparatus according to the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a schematic diagram of an electric power steering apparatus according to the present invention.

As shown in FIG. 1, the electric power steering apparatus includes a steering system 30 extending from a steering wheel 2 to two opposite wheels 26, and an auxiliary power mechanism 40 for providing the steering system 30 with auxiliary steering power.

The steering system 30 includes a steering wheel 2, and a steering shaft 6 one end of which is connected to the steering wheel 2 to be rotated together with the steering wheel 2 and an opposite side of which is connected to a pinion shaft 8 by means of a pair of universal joints 4. Here, the pinion shaft 8 is connected to a rack bar 12 through a rack/pinion mechanism 10, and opposite ends of the rack bar 12 are connected to the wheels 26 of the vehicle through a tie rod 22 and a knuckle arm 24.

The auxiliary power mechanism 40 may include a torque sensor 42, a steering sensor 43, an electronic control unit 44, a motor 46, and a reducer 50.

Here, the motor 46 generates auxiliary power based on a control signal transmitted from the electronic control unit 44, and the reducer 50 includes a worm gear 52 and a worm wheel gear 56 to transmit the auxiliary power generated in the motor 46 to the steering shaft 6.

The torque sensor 42 is mounted to the steering shaft 6 to detect a torque applied to the steering wheel 2 by a driver and output an electrical signal proportional to the detected torque. Then, the torque sensor 42 outputs a positive or negative electrical signal according to a rotation direction of the steering wheel 2. For example, the torque sensor 42 outputs a positive electrical signal when the steering wheel 2 is rotated from the left end to the center or from the center to the right end. In contrast, the torque sensor 42 outputs a negative electrical signal when the steering wheel 2 is rotated from the right end to the center or from the center to the left end.

Here, the left end corresponds to a location where the steering wheel 2 is rotated to the left side such that it cannot be further rotated, and the right end corresponds to a location where the steering wheel 2 is rotated to the right such that it cannot be further rotated. The center corresponds to a state in which the wheels 26 are parallel to the body of the vehicle, that is, a state in which the steering wheel 2 is not rotated.

The steering sensor 43 may output an electrical signal proportional to a rotation angle of the steering wheel 2 generated as the driver rotates the steering wheel 2, and generate a positive or negative electrical signal according to a rotation direction of the steering wheel 2. For example, when the driver rotates the steering wheel 2 from the center toward the right end or from the right end toward the center, the steering sensor 43 generates a positive electrical signal. In contrast, when the driver rotates the steering wheel 2 from the center toward the left end or from the left end toward the center, the steering sensor 43 generates a negative electrical signal.

Accordingly, the electrical signals generated by the steering sensor 43 and the torque sensor 42 according to a rotation direction of the steering wheel 2 is as shown in FIG. 2. As shown in FIG. 2, when the steering wheel 2 is rotated from the center to the right end, the steering sensor 43 generates a positive electrical signal and the torque sensor 42 generates a positive electrical signal. Further, when the steering wheel 2 is rotated from the center to the left end, the steering sensor 43 generates a negative electrical signal and the torque sensor 42 generates a negative electrical signal.

That is, when the steering wheel 2 is rotated from the center to the right end, both the steering sensor 43 and the torque sensor 42 generate positive electrical signals, so the codes of the electrical signals from the steering sensor 43 and the torque sensor 42 are the same. Likewise, when the steering wheel 2 is rotated from the center to the left end, both the steering sensor 43 and the torque sensor 42 generate negative electrical signals, so the codes of the electrical signals from the steering sensor 43 and the torque sensor 42 are the same.

On the other hand, when the steering wheel 2 is rotated from the right end to the center, the steering sensor 43 generates a positive electrical signal and the torque sensor 42 generates a negative electrical signal, so the codes of the electrical signals from the steering sensor 43 and the torque sensor 42 are different. Likewise, when the steering wheel 2 is rotated from the left end to the center, the steering sensor 43 generates a negative electrical signal and the torque sensor 42 generates a positive electrical signal, so the codes of the electrical signals from the steering sensor 43 and the torque sensor 42 are different.

When the electrical signal from the steering sensor 43 and the electrical signal from the torque sensor 42 are different, that is, when the steering wheel 2 is rotated from the right end or left end to the center, a necessary output of the motor 46 may increase. Accordingly, a rotation feeling of the steering wheel 2 deteriorates, causing a catching feeling while the steering wheel 2 is rotated.

The electronic control unit 44 generates a control signal for controlling the motor 46 based on electrical signals transmitted from the torque sensor 42 and the steering sensor 43. That is, the electronic control unit 44 can adjust a current provided to the motor 46 to adjust an assistant torque, thereby adjusting a torque of the steering wheel 2.

Further, the electronic control unit 44 may perform a rack end stop function. When the driver rotates the steering wheel 2 toward the right side or the left end, the end stop function reduces an output, that is, a current provided to the motor 46 before the steering wheel 2 mechanically contacts the end, preventing the steering wheel 2 from mechanically contacting the end.

Figure 3:
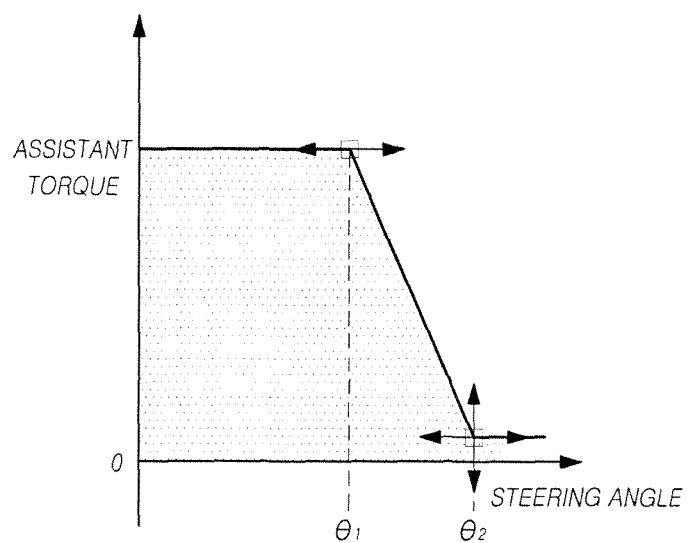
FIG. 3 is a graph depicting an auxiliary torque of a motor according to a steering angle when a rack end stop function is performed.

Due to the rack end stop function, an amount of current provided to the motor 46 is small when the steering wheel 2 is located at the right or left end. As shown in FIG. 3, until a rotation angle of the steering wheel 2 becomes larger to a predetermined rotation angle θ1, the amount of current is maintained the same. And if a rotation angle of the steering wheel 2 is the predetermined rotation angle θ1 or larger, an amount of current gradually decreases, so that the amount of the current becomes minimal before the steering wheel 2 reaches a maximum rotation angle θ2. Then, a minimum amount of current provided to the motor 46 is larger than 0, but the motor 46 is not actually driven. It is because an amount of current exceeding a maximum stationary frictional force of the steering wheel 2 needs to be provided to rotate the steering wheel 2, but a driving force of the motor 46 by the minimum amount of current provided to the motor 46 does not exceed a maximum stationary frictional force when the steering wheel 2 corresponds to a maximum rotation angle θ2.

Meanwhile, in order to prevent a necessary output of the motor 46 to generate a catching feeling when the codes of electrical signals provided from the torque sensor 42 and the steering sensor 43 are different, that is, the steering wheel 2 is rotated from the right or left end to the center, the electronic control unit 44 ramps up an amount of current provided to the motor 46 to a level before the rack end stop function is performed to ramp up an assistant torque of the motor 46 when a rotation angle of the steering wheel 2 is a preset ramp-up angle θ3 or larger. That is, when the steering wheel 2 is rotated from the right or left end to the center, the electronic control unit 44 increases an amount of current provided to the motor 46 as compared with the case of performing the rack end stop function.

Figure 4:
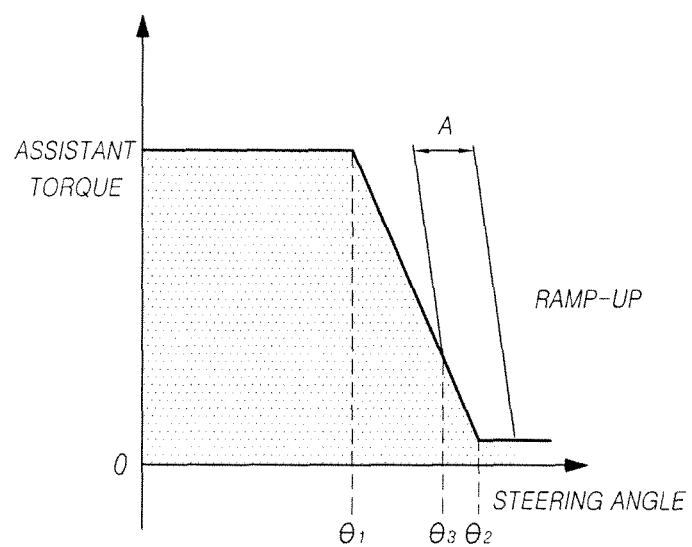
FIG. 4 is a graph depicting a state of adjusting an auxiliary torque when codes of electrical signals from the steering sensor and the torque sensor do not agree with each other.

In more detail, as shown in FIG. 4, due to the rack end stop function, an amount of current provided to the motor 46 is reduced until the steering wheel 2 reaches the left or right end when a rotation angle of the steering wheel 2 is the predetermined rotation angle θ1 or larger.

Accordingly, the electronic control unit 44 ramps up an amount of current provided to the motor 46 into a state before the rack end stop function is performed in a predetermined section A including the left end or the right end in a section of the rotation angle θ1 or larger. That is, the torque restricted by the rack end stop function is ramped up to a level before the rack end stop function is performed. In this case, as a sufficient amount of current is provided to the motor 46 in the predetermined section A including the left end or the right end so that an assistant torque of the motor 46 increases, a catching feeling is not generated even when the steering wheel 2 is rotated toward the center.

It is apparent that although the amount of current provided to the motor 46 is ramped up to a level before the rack end stop function is performed in the above-described embodiment, the amount of current provided to the motor 46 may be a level enough to remove a catching feeling of the steering wheel 2. Further, an amount of current provided to the motor 46 may be different according to a model of a vehicle and may be determined through an experiment of the vehicle, and thus the specification does not define an amount of current.

Meanwhile, when the codes of electrical signals generated by the torque sensor 42 and the steering sensor 43 are different, that is, the steering wheel 2 is rotated from the left or right end to the center, the electronic control unit 44 may control such that the rack end stop function is not performed. That is, when the steering wheel 2 is rotated from the left or right end to the center, the electronic unit 44 can prevent an amount of current of the motor 46 from being restricted by the rack end stop function to prevent in advance an assistant torque from being reduced, thereby preventing generation of a catching feeling when the steering wheel 2 is rotated.

Figure 5:
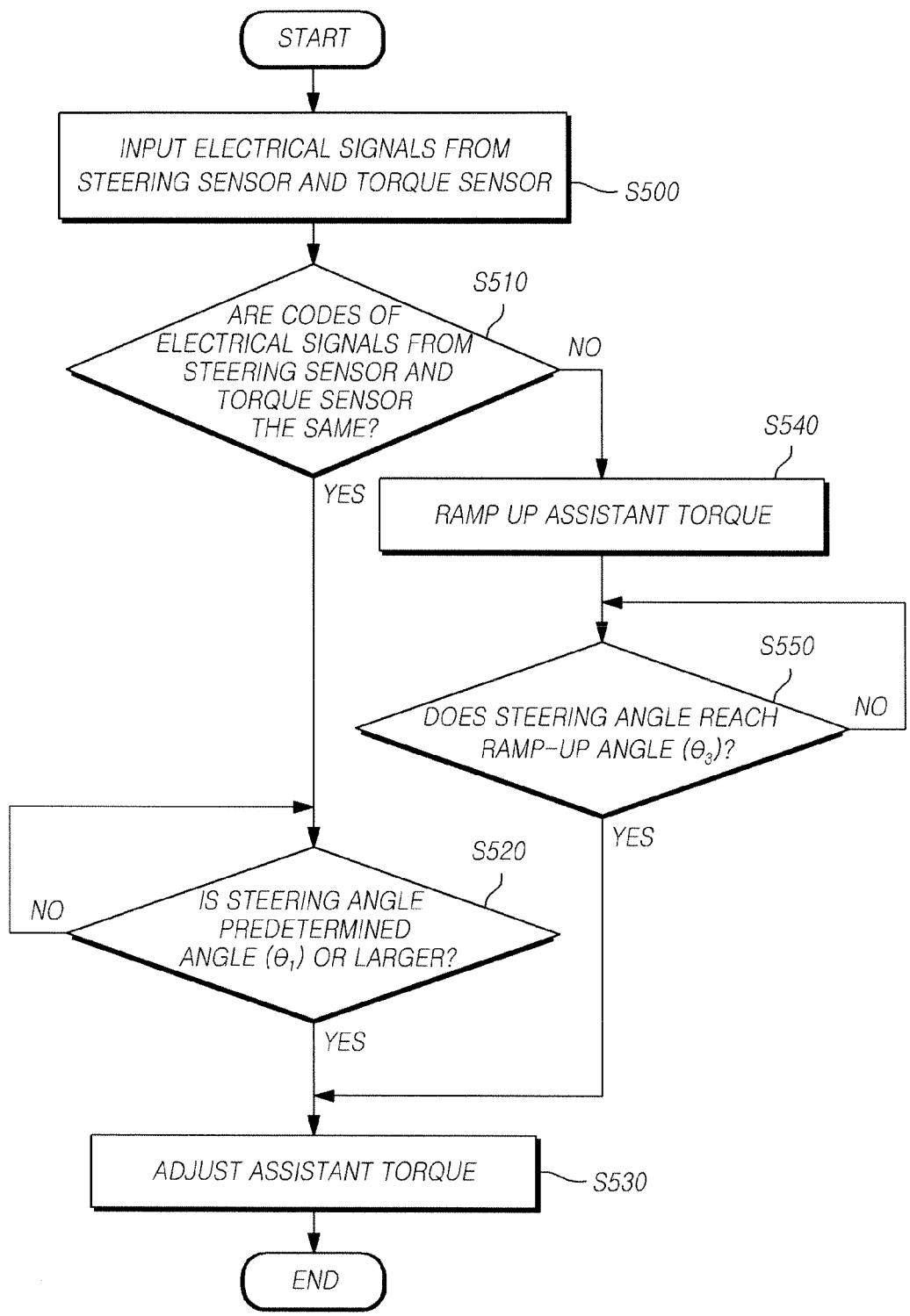
FIG. 5 is a flowchart showing a torque control process of an electric power steering apparatus according to an embodiment of the present invention.

Hereinafter, a process of controlling a current supplied to the motor 46 according to electrical signals of the steering sensor 43 and the torque sensor 42 according to the electric power steering apparatus of the embodiment of the present invention will be described with reference to FIG. 5.

The electronic control unit 44 of the electric steering apparatus is provided with electrical signals provided from the steering sensor 43 and the torque sensor 42 (S500), and determines whether the electrical signals from the steering sensor 43 and the torque sensor 42 are the same or different (S510).

When the codes of the electrical signals from the steering sensor 43 and the torque sensor 42 are the same, that is, when the steering wheel 2 is rotated from the center to the right or left end, the electronic control unit 44 reduces a current provided to the motor 46 according to the ramp end stop function to adjust an assistant torque (S530) if a rotation angle of the steering wheel 2 detected by the steering sensor 43 is a preset angle θ1 or larger (S520).

If it is determined that the codes of the electrical signals from the steering sensor 43 and the torque sensor are different while the rack end stop function is performed, the steering wheel 2 starts to be rotated or is being rotated from the right or left end to the center.

Then, the electronic control unit 44 returns an amount of current provided to the motor 46 to a level before an amount of current provided to the motor 46 is restricted by the rack end stop function until a rotation angle of the steering wheel 2 reaches a preset ramp-up angle θ3 (S540). Next, if a rotation angle of the steering wheel 2 reaches the ramp-up angle θ3 (S550), the electronic control unit 44 controls an amount of current provided to the motor 46 according to the rack end stop function to adjust an assistant torque (S530).

Figure 6:
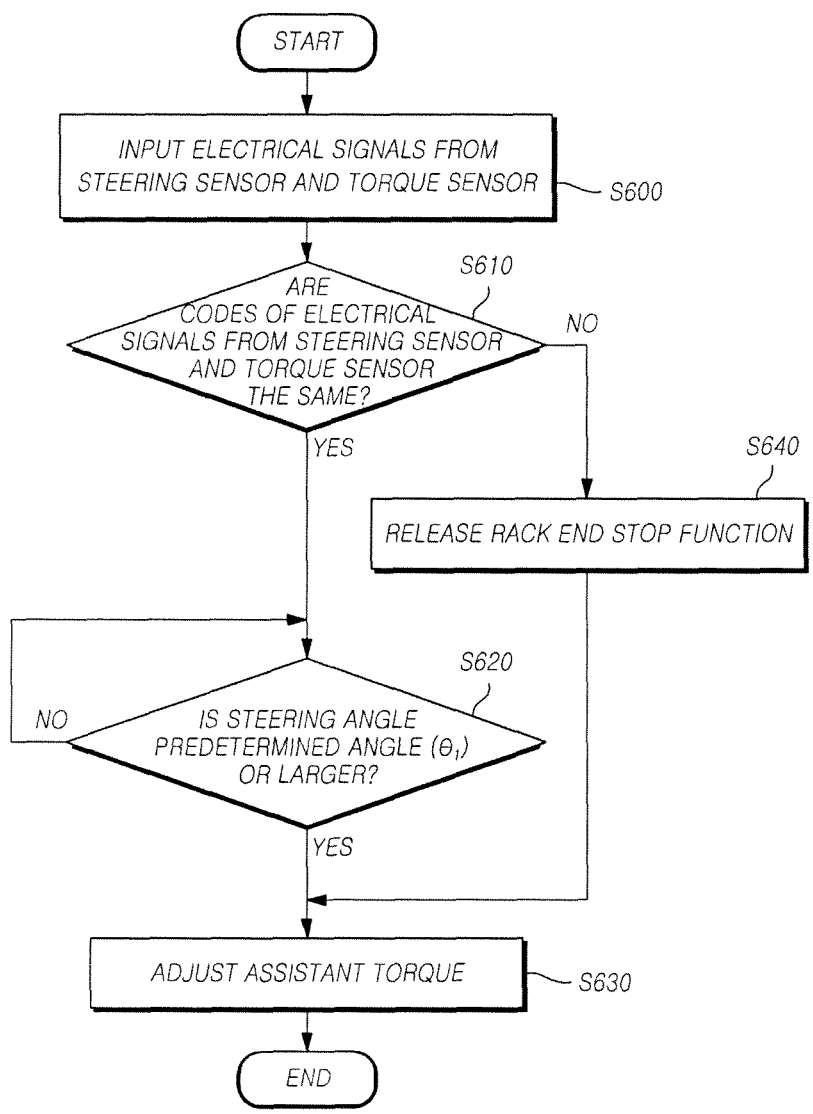
FIG. 6 is a flowchart showing a torque control process of an electric power steering apparatus according to another embodiment of the present invention.

Hereinafter, a process of controlling a current supplied to the motor 46 according to electrical signals of the steering sensor 43 and the torque sensor 42 according to an electric power steering apparatus of another embodiment will be described with reference to FIG. 6.

The electronic control unit 44 of the electric steering apparatus is provided with electrical signals provided from the steering sensor 43 and the torque sensor 42 (S600), and determines whether the electrical signals from the steering sensor 43 and the torque sensor 42 are the same or different (S610).

When the codes of the electrical signals from the steering sensor 43 and the torque sensor 42 are the same, that is, when the steering wheel 2 is rotated from the center to the right or left end, the electronic control unit 44 reduces a current provided to the motor 46 according to the ramp end stop function to adjust an assistant torque (S630) if a rotation angle of the steering wheel 2 detected by the steering sensor 43 is a preset angle θ1 or larger (S620).

If the codes of the electrical signals from the steering sensor 43 and the torque sensor 42 are different, the steering wheel 2 starts to be rotated or is being rotated from the right or left end to the center. Then, the electronic control unit 44 stops performing the rack end stop function (S640). That is, since an amount of current provided to the motor 46 is not restricted, generation of a catching feeling can be prevented.

In this way, by ramping up an amount of current of the motor 46 by using the rack end stop function or restricting the rack end stop function when the steering wheel 2 is rotated from the right or left end to the center, a catching feeling can be prevented when the driver rotates the steering wheel 2 from the right or left end to the center.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An electric power steering apparatus comprising:
   a torque sensor for detecting a torque applied to a steering wheel and outputting an electrical signal proportional to the detected torque;
   a steering sensor for outputting an electrical signal proportional to a rotation angle of the steering wheel;
   a motor for generating an auxiliary power applied to the steering wheel; and
   an electronic control unit for comparing a code of the electrical signal output from the torque sensor and a code of the electrical signal output from the steering sensor to determine whether the respective codes of the electrical signals are the same or different, and for adjusting an amount of current applied to the motor according to the determination,
   wherein the electronic control unit decreases the amount of current applied to the motor when it is determined that the respective codes of the electrical signals are the same and the rotation angle of the steering wheel is equal to or larger than a predetermined angle, and
   wherein when a rack end stop function for reducing a current applied to the motor at opposite ends of the steering wheel is applied, the electronic control unit ramps up the amount of current of the motor restricted by the rack end stop function if the codes of the electrical signals generated by the torque sensor and the steering sensor are different.

2. The electric power steering apparatus as claimed in claim 1, wherein if the torque sensor generates a positive electrical signal and the steering sensor generates a negative electrical signal as the steering wheel is rotated from a left end to a center, the electronic control unit ramps up the amount of current of the motor restricted by the rack end stop function.

3. The electric power steering apparatus as claimed in claim 1, wherein if the torque sensor generates a negative electrical signal and the steering sensor generates a positive electrical signal as the steering wheel is rotated from a right end to a center, the electronic control unit ramps up the amount of current of the motor restricted by the rack end stop function.

4. An electric power steering apparatus comprising:
   a torque sensor for detecting a torque applied to a steering wheel and outputting an electrical signal proportional to the detected torque;
   a steering sensor for outputting an electrical signal proportional to a rotation angle of the steering wheel;
   a motor for generating an auxiliary power applied to the steering wheel; and
   an electronic control unit for comparing a code of the electrical signal output from the torque sensor and a code of the electrical signal output from the steering sensor to determine whether the respective codes of the electrical signals are the same or different, and for adjusting an amount of current applied to the motor according to the determination,
   wherein the electronic control unit decreases the amount of current applied to the motor when it is determined that the respective codes of the electrical signals are the same and the rotation angle of the steering wheel is equal to or larger than a predetermined angle, and
   wherein if the codes of the electrical signals generated by the torque sensor and the steering sensor are different, the electronic control unit restricts a rack end stop function.

5. A method of controlling an electric power steering apparatus, the method comprising:
   detecting a torque applied to a steering wheel, and outputting an electrical signal proportional to the detected torque;
   outputting an electrical signal proportional to a rotation angle of the steering wheel;
   comparing a code of the electrical signal output from a torque sensor and a code of the electrical signal output from a steering sensor to determine whether the respective codes of the electrical signals are the same or different;
   adjusting an amount of current applied to a motor for generating auxiliary power applied to the steering wheel according to the determination; and
   decreasing the amount of current applied to the motor when it is determined that the respective codes of the electrical signals are the same and the rotation angle of the steering wheel is equal to or larger than a predetermined angle,
   wherein in the adjusting of the amount of current, the performance of the rack end stop function is restricted if the codes of the electrical signal proportional to the torque and the electrical signal proportional to the rotation angle are different.

* * * * *